UNITED STATES PATENT OFFICE.

ABRAHAM E. HORN, OF NEW YORK, N. Y.

PROCESS OF WATERPROOFING CONCRETE.

1,088,022.  Specification of Letters Patent.  Patented Feb. 24, 1914.

No Drawing. Application filed September 18, 1912. Serial No. 720,928.

*To all whom it may concern:*

Be it known that I, ABRAHAM E. HORN, a citizen of the United States, and a resident of New York, in the county of New York and State of New York, have invented certain new and useful Improvements in Processes of Waterproofing Concrete, of which the following is a specification.

This invention relates to waterproofing concrete and similar cementitious material and relates in particular to improvements in the art of waterproofing concrete and the like, containing large amounts of sand and gravel or other filling material or aggregates, involving the use of an air-unstable metathetically-reacting quasi-soap or loosely-saponified material of water-soluble or water-extensible nature; preferably comprising ammonium stearate: all as more fully hereinafter described and as claimed.

My discovery, on which this invention is based or derived, has arisen from the following observation;—in the proportions commonly advocated for the purpose, the various waterproofing soaps of a water-insoluble nature, as stearate of lime and the like, and the water-soluble soaps as sodium or potassium oleate, palmitate, stearate, resinate and the like, will waterproof a 1:2 cement and sand mixture very satisfactorily. Some of these will waterproof a 1:3 mixture. A few will waterproof a 1:4 mixture. Practically none of these will waterproof a 1:5 mixture to the accepted extent required by the artisan, and in no case is a 1:6 mixture given satisfactory waterproofing qualities under these circumstances.

As the use of mixture 1:5 or 1:6, as well as cement, sand and gravel mixtures of 1:2:3 or 1:3:5, etc., proportions is quite customary, it is evident that waterproofing on such a basis with the common waterproofing agents of the market, is a failure under these conditions. On the other hand increase in the proportion of the waterproofing compound to cement is undesirable because these compounds have, if anything, the tendency to weaken cement by interfering more or less with the bonding action. It is quite evident that in well extended mixtures such as 1:3:5 and the like, the bonding action should be maintained at a maximum to secure the expected strength of the resulting concrete. The quandary in which this hitherto unsolved problem has left the waterproofing engineer, has now been eliminated or solved by me in a very simple and cheap but totally unexpected manner.

By taking stearic acid and combining it with ammonium hydroxid especially in the presence of a considerable amount of water or water-yielding material so as to form in particular an air-unstable metathetically-reacting quasi-soap or loosely-saponified material of a water-soluble or water-extensible nature, I secure a remarkable reactive body of great potential waterproofing qualities; that is to say, one which when brought in contact with the cement in the presence of moisture, reacts with extreme vigor or avidity forming a highly disseminated water-insoluble stearate or complex stearate and silico-stearate or alumino-stearate of tremendous watershedding properties while the alkali being liberated and being rendered thereby entirely volatile is removed sooner or later from the seat of the reaction so that its presence as a de-waterproofing agent is not manifested. I am not at this time able to ascribe with definiteness, all the reasons for the peculiar and specific action of this remarkable waterproofing reaction but believe that among other things the ability to automatically free the concrete substantially from de-waterproofing alkali coupled with the reactivity of the stearate material existing in the peculiar quasi-soap or loosely saponified quasi-colloidal body accounts in part for this efficiency. My investigations and observations however lead me to the conviction that there is a further reaction which tends also to augment the waterproofing action, this being in part the formation of complex stearates or silico and alumino stearates of lime, magnesia, alumina and iron all depending on the nature of the cement and aggregate and other conditions which need not be detailed here.

The preparation of the compound should by all means preferably be carried out in the presence of a great excess of moisture, thus insuring the formation of water-soluble amid-free hydrated ammonium quasi-soap or air-unstable hydrated ammonium stearate and the like. Preferably an amount of ammonia should be used which slightly underneutralizes the stearic acid so as to give an acidic compound, although by hydrolysis the reaction is alkaline. Under some circumstances the composition may be rendered truly alkaline or basic by the addition of an excess of ammonia. This special composition is perhaps especially desirable in the presence of highly silicious aggregates or reactive acidic rock material.

A quantity of water sufficient to permit the composition to take a paste form of a variable degree of consistency, according to circumstances, should be used. Or the water may be substituted in part at least by alcohol and the like, which tends to reduce the consistency and to prevent the composition thickening and becoming difficultly soluble or miscible in cold weather. It is important that the composition mingle freely with water, even though the latter be very cold, as it is my purpose particularly, to mix the potential waterproofing compound with water used in gaging the concrete material, so that according to the amount of such material the gaging water and likewise the potential waterproofing compound is increased or decreased in proportion substantially with the quantity of material used.

Various bodies capable of forming quasi-soaps may be used such as the fatty acids of corn or Chinese wood oil. Tung oil fatty acids are as stated in U. S. Letters Patent for waterproofing compounds granted to A. C. Horn July 2, 1912, No. 1,031,003, capable of uniting with lime to form waterproofing compounds resistant to hydrolytic action. and the ammonia soap in proper colloidal or loosely saponifiable form is a desirable ingredient of the compositions discussed above.

The fatty acids of fish oil such as menhaden and porgy oil form suitable quasi soaps more particularly if blown prior to forming the unstable combination with the ammonia base. By blowing possibly a hydroxy acid is obtained which has the desired properties as an ammonia soap material. The resins form soaps with ammonia but most of these are unsuited for the present purpose on account of their lack of loose saponification as it were, or to some property of a disadvantageous character not appearing in the stearates for example. Then too, the ammonia resinates such as those of manila and rosin do not affect concrete advantageously in many instances.

Ordinary oleic acid in combination with ammonia has fair potential waterproofing qualities and also palmitic acid is fairly serviceable; but do not give results of a satisfactory character under some conditions when using a 1:6 mixture or thereabouts. The ammonium stearate material of a quasi soapy nature containing air-unstable metathetically-reacting bodies represents the preferred form of the present invention.

In the foregoing I have mentioned illustratively several bodies in part of an equivalent character which may be used under the present invention, but it is to be noted that by such illustrative disclosure I do not limit myself to the exact formulas or combinations or procedures mentioned but may use other materials giving like results or functionally similar and hence may invoke the doctrine of equivalency in so far as same may be thus applicable.

I am aware of the use of water soluble soaps such as those of the alkaline base, sodium, for the purpose of waterproofing concrete and I do not wish to be understood as including soapy material functioning in this manner. When sodium oleate, for example, reacts with the lime of the cement, the oleate of lime is formed and the soda set free as the hydroxid or the carbonate, in all probability. This fixed alkali remains in the concrete, often giving rise to efflorescence and tends to exhibit a de-waterproofing action apparently in the course of time so that the calcium soap formed *in situ* or in the mass when mixed, is reconverted or oxidized or otherwise changed in the presence of this fixed alkali, so as to be fairly vulnerable to the ingress of moisture after a time.

Ordinarily no strengthening or hardening material is required but in the case of treatment of floors sometimes a hardened surface is called for, in order to eliminate "dusting." In such cases apart from the use of special hardening material such as indicated, it becomes desirable to use as a waterproofing material solely ammonium stearate properly hydrated and existing in the quasi-soap form or in a peculiar colloidal air-unstable condition as set forth in the foregoing.

I believe myself to be the first to have satisfactorily waterproofed very extended mixtures of concrete or cement by the use of a modicum of a waterproofing agent and the present invention comprises as a new article of manufacture or new product, a structural mass of concrete or similar material carrying within its mass a modicum of precipitated lime or similar soap more or less attached or chemically combined with some of the acedic or other basic elements of the cement to form a complex of remarkable water shedding properties, said concrete being substantially or essentially free from fixed alkali or volatile alkali in order to preclude de-waterproofing or degenerative action of said alkali on the *in situ* formed waterproofing agent.

I do not wish the foregoing to indicate any limitation as to the proportions of cement and sand or other filling material which may be used in carrying out the present invention. While with a 1:5 or a 1:6 mixture I am enabled to secure these unusual results, I may equally well use the more customary mixtures of 1:2; 1:3; or 1:4. The main reason why the ordinary waterproofing materials on the market are successful in a 1:2 mix, is a question of the ratio of material to voids. With the average sands in general use, the voids amount to about 33⅓%. Therefore, in two (2) cubic feet of sand, ⅔ of a cubic foot of void filling material would be required to fill the voids; whereas in fact one cubic foot of cement is used, or an excess of ⅓ of a cubic foot. This proportion decreases as the cement is extended with sand; therefore, in a 1:4 mixture, 1⅓ cubic feet of cement should be used to completely fill the voids. Since, however, the cement cannot of course completely fill the voids, and as most of the waterproofing compounds heretofore proposed are wanting in those water-repellent qualities which would entirely make up this deficiency, very unsatisfactory results are generally afforded in the endeavor to waterproof mixtures such as ⅓; or ¼. Yet these latter mixtures, apart from the greater difficulty of water-proofing, are preferred, because they are less prone to show hair cracks than the ½ mixtures.

The present invention makes possible the economical waterproofing of any mixture ranging from 1:2, or 1:3, more or less, and up to 1:5, or 1:6, and thus supplies a great want in the cement waterproofing industry.

What I claim is;—

1. In the art of waterproofing concrete, the step which consists in adding to a highly extended cement, a relatively small amount of a solution of ammonium stearate, whereby molecular complexes are formed and ammonia liberated.

2. In the art of waterproofing concrete, the step which consists in adding to a highly extended cement, a relatively small amount of ammonium stearate incorporated with the gaging water; whereby molecular complexes are formed and ammonia liberated.

3. In the art of waterproofing concrete, the step which consists in adding to concrete a solution of air-unstable ammonium stearate.

4. In the art of waterproofing concrete, the step which comprises adding to concrete materials a solution of air-unstable ammonium stearate free from all other alkali.

5. In the art of waterproofing concrete, the step which comprises adding to concrete materials a solution of ammonia soap of an air-unstable character and substantially free from other alkali.

Signed at Cleveland in the county of Cuyahoga and State of Ohio this 9th day of September A. D. 1912.

ABRAHAM E. HORN.

Witnesses:
E. A. GUINN,
E. H. McINTOSH.

---

Copies of this patent may be obtained for five cents each, by addressing the "Commissioner of Patents, Washington, D. C."